United States Patent Office 2,787,917
Patented Apr. 9, 1957

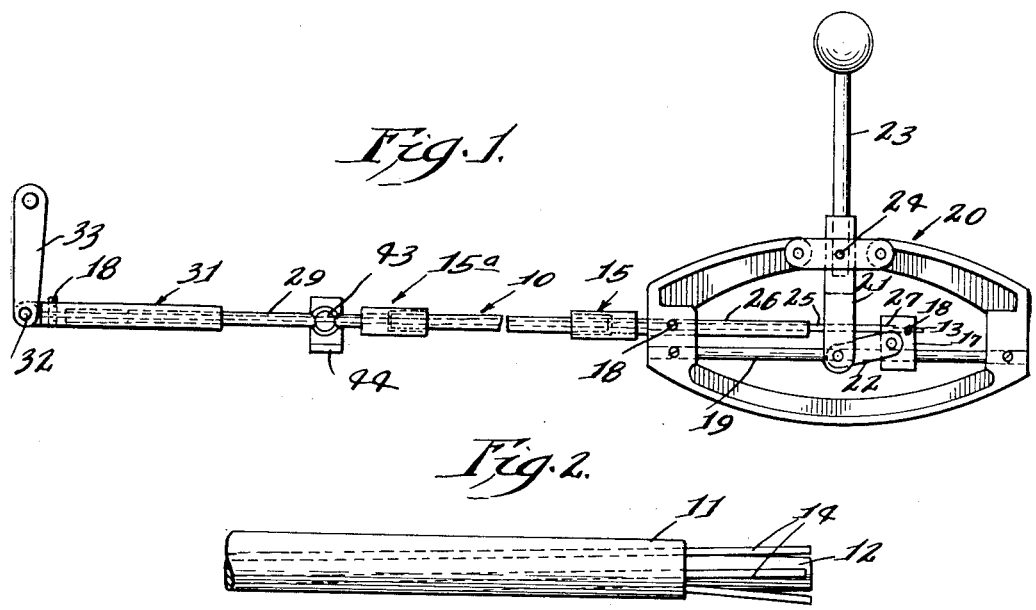

2,787,917

PUSH-PULL CONTROL AND TRANSMISSION CABLE

Simon E. Schroeder, Oshkosh, Wis., assignor to Fox River Manufacturing Company, a corporation of Wisconsin Application July 5, 1955, Serial No. 519,899

7 Claims. (Cl. 74—502)

The present invention relates to a novel flexible transmission cable for manually controlling operating mechanism from a remote station, and more particularly to a novel assembly and the means and manner of constructing and assembling the cable and its end fittings whereby to eliminate stretch and compression in the assembled cable.

Flexible transmission cables are provided for the remote control of or transmission of power to mechanisms to be operated. Such cables are frequently employed in controlling the throttle and shift mechanism of a motor of an outboard or inboard motor boat, for use in automobiles such as in the operation of chokes, for throttle controls, speedometers, ignition systems, power take-offs and for numerous other uses where a control of this character is susceptible of use.

Among the objects of the present invention is the provision of a novel flexible transmission cable for the remote control of mechanism to be operated, including concentric plastic sleeves providing a housing for a flexible transmission wire or control core, and a novel end fitting or ferrule rigidly affixed to each of the opposite ends of a desired length of the cable with one end connected to a sleeve member housing one end of the control wire or core with the latter attached to a control mechanism for manually actuating the control wire or core, and the other end fitting or ferrule connected to a sleeve member housing the other end of the control wire or core and the latter connected to the mechanism to be operated or controlled thereby.

Another object of the present invention is the provision of a novel flexible transmission cable including a novel continuous length of plastic sheathing for housing the control core or transmission wire with the sheathing adapted to be readily cut to any desired length of cable depending upon the distance of the mechanism to be operated from the remote control station, this sheathing when assembled with its connected end fittings and its contained and longitudinally adjustable control core or transmission wire providing a novel assembly with the control core or transmission wire connected at one end to the mechanism to be operated and at its other end to suitable control or operating mechanism.

The present invention further comprehends a novel sheathing for a flexible transmission cable including concentric, flexible plastic sleeves of dissimilar composition, the outer sleeve having spaced and spirally arranged armor wires embedded in its inner circumference and with the ends of these wires projecting beyond the adjacent ends of the sleeves and bent back onto the outer sleeve for assembly of each end of the assembly into an end fitting or ferrule in such manner as to eliminate stretch or compression of the cable.

A further object of the present invention is the provision of a novel method and manner of assembling a flexible transmission cable with its end fittings in such manner as to effectively eliminate any variation in its length.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a fragmentary view in side elevation of a novel remote control flexible transmission cable and showing an illustrative embodiment of a controlling mechanism for effecting movement of the cable to remotely control operation of any suitable mechanism.

Fig. 2 is a fragmentary, enlarged view in side elevation of one end of the novel flexible transmission cable and showing the initial step or stage in the preparation of this end for the application thereto of an end fitting or ferrule.

Fig. 3 is a view similar to Fig. 2 but showing the next step or stage in the preparation of the end of the cable prior to applying thereto the end fitting or ferrule.

Fig. 4 is a fragmentary, enlarged view in side elevation showing the next step or stage in preparing the end of the cable for the reception of the end fitting in which a longitudinally or axially grooved ring or collar is arranged over the end of the transmission cable and the embedded armor wires bent back over this ring or collar with each of the spaced wires located in one of the grooves.

Fig. 5 is a fragmentary view in vertical cross section taken longitudinally through the end assembly of Fig. 4 with the encompassing ferrule or end fitting assembled thereon.

Fig. 6 is a view in vertical cross section taken transversely through the end assembly of Fig. 5, the view being taken in a plane represented by the line 6—6 and viewed in the direction of the arrows.

Fig. 7 is a fragmentary view in side elevation of a section of the novel flexible transmission cable after the novel end fittings or ferrules have been applied thereto and anchored thereon.

Referring more particularly to the disclosure in the drawing and to the illustrative embodiment shown therein, any suitable controlling mechanism may be provided for actuating the housed wire or core of a transmission cable capable of operating throttles or shift mechanisms for motor boats, automobiles, and for other control operations where a transmission cable is or may be employed for controlling suitable operating mechanism from a remote station. Thus the controlling mechanism here disclosed is but illustrative of one form of remote control mechanism such as may be employed for operating the throttle or shift mechanism of a motor of an outboard or inboard motor boat, and is not to be taken as limiting the present invention to any particular controlling mechanism.

The novel flexible transmission or push-pull cable of the present invention is designated generally by the reference character 10 and consists of an outer flexible covering, sleeve or tubular member 11 of polyethylene or plastic composition, an inner flexible covering, sleeve or tubular member 12 of "Saran" (copolymer of acrylonitrile-vinylidene chloride) or plastic composition, a flexible transmission wire or core 13 housed within the sleeve or tubular member 12, spaced armor wires 14 spirally arranged and embedded in the inner circumference of the plastic sleeve or tubular member 11 and between the latter and the exterior of the inner plastic sleeve or tubular member 12, and end fittings or ferrules 15 and 15ª.

Each end fitting or ferrule 15 and 15ª comprises a rigid housing or tubular member 16 having a bore for conformably receiving the sheathed cable and its contained transmission wire or core 13 and permitting longitudinal movement of this wire or control core for actuating remote mechanism to be operated. In the illustrative embodiment selected to illustrate the present invention, one end of the transmission wire or core 13 is shown affixed to a sliding block 17 by a set screw or other securing means 18. This block is shown slidably mounted on a rod 19 spanning and having its opposite ends secured in the opposite sides or ends of a bracket or housing 20.

The block 17 is connected to the lower end of an upright control arm 21 of a shift or controlling mechanism by means of a link or toggle 22 pivotally connected at its opposite ends to the block and arm. A handle 23 is adapted to move the lower end of the arm 21, the link or toggle 22, the block 17 and the flexible transmission wire or core 13 back and forth with the arm 21 being pivotally mounted at 24 in the bracket or housing 20.

In the disclosed assembly, the transmission wire or core 13 beyond its reception in the novel flexible transmission cable 10 is shown slidably received in an encompassing sleeve or tubular member 25 and the latter in an outer sleeve or tubular member 26 encompassing the sleeve 25 and with these sleeves fixedly or securely retained in a bore in the housing 20 by means of a set screw 18. These sleeves 25 and 26 may be of metal or other suitable substantially rigid material since these need not be of flexible construction.

One end of the inner sleeve 25 is loosely received in an opening 27 in the block 17 and the other end threaded into a tapped opening 28 in the adjacent end of the fitting or ferrule 15, whereby to rigidly connect these parts. One of these end fittings or ferrules 15 or 15ª is applied to each end of the flexible transmission or push-pull cable 10, with the end fitting 15ª adapted to receive one end of a substantially rigid sleeve or tubular member 29 of metal or other suitable substantially rigid material. The other end of this sleeve or tubular member 29 is adapted to be received in one end of a hollow arm 31, with the transmission wire or core 13 being longitudinally slidable in its encompassing sleeve 29 but with the end of the transmission wire or core 13 secured to the arm 31 by a set screw or other attaching means 18. The outer end of the arm 31 is pivotally connected at 32 to a link or toggle 33 adapted to control the operated or actuated device or mechanism (not shown) from a remote station through the handle 23.

The present invention further comprehends a novel method and manner of applying the end fittings 15 and 15ª to the transmission cable 10. This is accomplished by cutting a section of cable to the length required, plus approximately two inches, thereby allowing approximately one inch at each end over that required for mounting the end fittings. Then with a sharp knife or suitable cutting tool, the polyethylene or plastic covering or outer sleeve 11 is stripped from the cable 10 as shown in Fig 2. Next the plastic tube or inner sleeve 12 is severed substantially flush with the end of the outer sleeve 11 to permit the free ends of the spaced armor wires 14 to protrude for approximately one inch and the end of the bore or opening of the inner sleeve is chamfered to permit the free insertion of the transmission wire or core 13 which is preferably of stainless steel or the like.

An externally and longitudinally grooved ring, washer or collar 34 is then placed over the protruding wires 14 in abutting engagement with the adjacent end of the outer plastic sleeve or tube 11 and the ends of the wires 14 are bent rearwardly over the tapered edge 35 of the ring or washer 34 with each spaced wire 14 being received in a similarly spaced longitudinal groove or slot 36 in the outer circumference of the ring or washer. This is shown in Fig. 4 with the wires 14 bent back onto the outer plastic sleeve or covering 11. The end fitting or ferrule 15 is then slipped over the end of the cable 10 in the manner shown in Fig. 5.

The end fitting or ferrule 15 is cored or recessed to provide an opening to conformably receive the end of the cable 10 (Fig. 4) with the end, where the bent ends of the armor wires 14 protrude, abutting the shoulder or stop 37 within the end fitting or ferrule. The end fitting or ferrule is also provided with the connected and aligned longitudinally extending and centrally located threaded opening 28 of smaller diameter through which projects the transmission wire or core 13 for reception in the sleeve 25 that is preferably threaded into the opening 28.

After the end fitting or ferrule 15 is located on the cable as in Fig. 5, a suitable crimping tool is employed to crimp it tightly onto the cable. This is preferably accomplished by employing the crimping tool in a bench vise or arbor press, crimping first the band 38 adjacent the knurled end 39 of the end fitting or ferrule 15 and then the band 41 on the end fitting or ferrule, whereby the latter is tightly crimped at 42 onto the end of the cable 10. After such crimping has been accomplished, the end assembly is preferably reamed for a depth of approximately two inches so as to remove any obstruction that may lie in the path of the transmission wire or core 13 when inserted into operative position in the cable 10 and the end fitting or ferrule 15. The other end fitting or ferrule 15ª is applied to the other end of the cable 10 in a similar manner.

If desired, the sleeve 29 for the transmission wire 13 may be provided with a ball 43 rotatably mounted in a socket or mounting 44 to form a universal connection and support for this sleeve and its contained transmission wire.

The cable 10 is now ready for the insertion or reception of the transmission wire or core 13, but before such insertion this transmission wire or core is lubricated by applying thereto a lubricating oil to facilitate smooth and frictionless operation of the transmission wire or core 13 upon moving the control handle or other operating means 23 to push or pull on this wire or core and thereby remotely operate any suitable mechanism to which the other end of the wire is connected.

From the above description and the disclosure in the drawing, it will be apparent that the present invention comprehends a novel flexible transmission or push-pull cable that eliminates any stretch or compression in the cable capable of resulting in variation in the length of the cable and lost motion between the remote actuating means and the mechanism whose operation is controlled by the transmission cable. In the novel embodiment, by anchoring the armor wires 14 in the manner disclosed these wires take care of both stretch and compression, for when the ends of these wires are bent over the ring or washer 34 and the end fittings or ferrules 15, 15ª are clamped tightly onto the outer sleeve 11 with the bent over ends of the wires 14 abutting against the rigid shoulder or stop 37 in each ferrule (see Fig. 5), compression is eliminated. As these wires 14 are wrapped about the ring or washer 34, elongation is also prevented.

Having thus disclosed the invention, I claim:

1. A flexible transmission cable for control mechanism comprising a sheathing including an outer flexible plastic sleeve, a longitudinally grooved ring at each end of the sleeves, an inner flexible plastic sleeve, spaced wires extending longitudinaly of and embedded in the interior surface of the outer sleeve and disposed about the inner sleeve with the ends of these wires extended beyond the ends of the sleeves and bent back onto the exterior of the outer sleeve with each wire located in a groove of the ring, end fittings consisting of a metal ferrule adapted to be affixed to each of the opposite ends of the sleeves and wires having a bore for receiving one end of the sleeves and its ring and the bent ends of the wires with the ferrule tightly anchored to the outer sleeve, and a transmission wire to be actuated by the control mechanism projecting through the inner sleeve and through the ends of the ferrules for connection to the control mechanism and mechanism to be operated thereby.

2. A flexible transmission cable for control mechanism comprising concentric plastic sleeves of different compositions, the outer sleeve having embedded therein spaced spirally arranged armor wires disposed between the contacting surfaces of the concentric sleeves, said wires projecting beyond the ends of the sleeves and thereat bent back onto the exterior of the outer sleeve, metal ferrules each providing an end fitting for an end of the cable with each ferrule having a bore therein adapted to conformably receive an end of the sleeves and the bent-over ends of the wires and a shoulder in the ferrule against which the wires abut, each ferrule being anchored to its contained end of the sleeves and the ends of the wires, and a flexible control core received and longitudinally movable in the bore of the inner sleeve and projecting through the ferrules for connection at one end to the control mechanism and at its other end to actuating mechanism whose operation is to be controlled thereby.

3. A flexible transmission cable for control mechanism comprising concentric plastic sleeves of different compositions, the inner circumference of the outer sleeve having embedded therein spaced spirally arranged armor wires disposed about the exterior of the inner sleeve and extending longitudinally thereof, said wires being of greater length than said sleeves with the ends of said wires being bent back over the ends of the outer sleeve, a ferrule for each end of said sleeves with each ferrule having a bore to conformably receive an end of said sleeves, a shoulder and an aligned threaded opening, a substantially rigid sleeve attached to the threaded opening, said ferrules when assembled on the ends of the sleeves with an end of the concentric sleeves conformably received in its bore and with the extreme end of the sleeves and the bent end armor wires engaging the shoulder in the ferrule, being anchored to the exterior of the outer sleeve and about the wires with the cable locked against stretch and compression, and a transmission wire received in the inner sleeve and projecting through the opening in each ferrule and its connected substantially rigid sleeve and adapted to be connected at one end to the control mechanism for operating the transmission wire and at its other end to the mechanism to be operated thereby.

4. A flexible transmission cable for remote control mechanism for actuating or operating suitable mechanism from the remote control mechanism, comprising concentric sleeves of flexible plastic composition, means for mounting the ends of said sleeves to prevent compression and stretch in the cable, said means including an end fitting for each end of the cable, armor wires embedded in the outer sleeve and with these wires arranged about the inner sleeve and their ends bent back from the ends of the concentric sleeves onto the exterior of the latter, with said end fitting tightly clamped about and encompassing the end of the sleeves and the ends of the wires, and a control core projecting through the inner sleeve and the end fittings for connection to the control mechanism and to the mechanism to be operated thereby.

5. A flexible transmission cable for remote control mechanism and containing a control core for actuating or operating suitable mechanism from the remote control mechanism, comprising concentric sleeves of flexible plastic composition, means for mounting the ends of said sleeves to prevent compression and stretch in the cable, said means including a collar abutting the end of the outer sleeve, an end fitting for each end of the cable, armor wires embedded in the outer sleeve and with these wires arranged about the inner sleeve and their ends bent back from the ends of the concentric sleeves over the collar onto the exterior of the outer sleeve with said end fitting tightly clamped about the end of the sleeves, the collar, and the ends of the wires.

6. In a flexible transmission cable for housing a control core for a remote control mechanism in which one end of the control core is attached to the control mechanism and the other end is attached to mechanism whose operation is controlled thereby, said cable comprising a pair of concentric flexible sleeves, armor wires in the outer sleeve and arranged longitudinally about the inner sleeve with the ends of the wires projecting beyond the ends of sleeves and folded back onto the exterior of the end of the outer sleeve, and a rigid end fitting encompassing each end of the flexible sleeves and having a bore for conformably receiving an end, said end of the sleeves and the end of the wires when anchored in an end fitting securing the wires against movement and maintaining the cable against variation in its length.

7. A flexible transmission cable for housing a control core for a remote control mechanism for actuating or operating suitable mechanism from the remote control mechanism, comprising concentric sleeves of flexible plastic composition with the inner sleeve of a copolymer of acrylonitrile-vinylidene chloride and the outer sleeve of polyethylene, means for mounting the ends of said sleeves to prevent compression and stretch in the cable, said means including a rigid end fitting for each end of the cable, armor wires embedded in the outer sleeve and with these wires arranged longitudinally about the inner sleeve and their ends bent back from the ends of the concentric sleeves onto the exterior of the outer sleeve with said end fitting tightly clamped over and encompassing the end of the sleeves and the bent ends of the wires, and a control core projecting through the inner sleeve and the end fittings for connection to the control mechanism and to the mechanism to be operated thereby.

References Cited in the file of this patent
UNITED STATES PATENTS

| 184,907 | Reed | Nov. 28, 1896 |
| 1,271,211 | Parker | July 2, 1918 |
| 1,867,579 | Mandelick | July 19, 1932 |
| 2,146,218 | Kimmich et al. | Feb. 7, 1939 |
| 2,298,736 | Harpfer | Oct. 13, 1942 |
| 2,641,303 | Vance | June 9, 1953 |
| 2,755,330 | Ludwig et al. | July 17, 1956 |

FOREIGN PATENTS

| 123,927 | Australia | Mar. 22, 1944 |
| 659,593 | Great Britain | Oct. 24, 1951 |
| 719,638 | Great Britain | Dec. 8, 1954 |